US012746962B2

(12) United States Patent
Sun

(10) Patent No.: US 12,746,962 B2
(45) Date of Patent: Sep. 29, 2026

(54) HANDCART OPEN ON TWO SIDES

(71) Applicant: Zhejiang Pride Leisure Products Co,. Ltd., Jinhua (CN)

(72) Inventor: Benlong Sun, Jinhua (CN)

(73) Assignee: ZHEJIANG PRIDE LEISURE PRODUCTS CO., LTD., Zhejiang Province (CN)

( * ) Notice: Subject to any disclaimer, the term of this patent is extended or adjusted under 35 U.S.C. 154(b) by 280 days.

(21) Appl. No.: 18/612,720

(22) Filed: Mar. 21, 2024

(65) Prior Publication Data

US 2024/0317287 A1 Sep. 26, 2024

(30) Foreign Application Priority Data

Mar. 21, 2023 (CN) ......................... 202320620568.8

(51) Int. Cl.
*B62B 3/02* (2006.01)
*B62B 3/00* (2006.01)
*B62B 5/04* (2006.01)
*B62B 5/06* (2006.01)

(52) U.S. Cl.
CPC .............. *B62B 3/025* (2013.01); *B62B 3/003* (2013.01); *B62B 5/061* (2013.01); *B62B 5/064* (2013.01); *B62B 5/04* (2013.01)

(58) Field of Classification Search
CPC ......... B62B 5/064; B62B 5/061; B62B 3/003; B62B 3/027; B62B 3/025
See application file for complete search history.

(56) References Cited

U.S. PATENT DOCUMENTS

| | | | | |
|---|---|---|---|---|
| 4,121,855 | A * | 10/1978 | Mortenson | B62B 1/12 280/654 |
| 5,388,854 | A * | 2/1995 | Kappaz | B62B 3/027 D34/24 |
| 5,547,205 | A * | 8/1996 | do Rosario Sousa de Cabedo | B62B 5/085 297/14 |
| 11,465,664 | B1 * | 10/2022 | Choi | B62B 3/025 |
| 11,572,091 | B1 * | 2/2023 | Wang | B62B 5/00 |
| 11,603,123 | B1 * | 3/2023 | Collado | B62B 5/06 |
| D1,027,352 | S * | 5/2024 | Wu | D34/12 |
| 11,981,364 | B2 * | 5/2024 | Ma | B62B 5/0461 |
| D1,075,569 | S * | 5/2025 | Xu | D12/19 |
| 2018/0057035 | A1 * | 3/2018 | Choi | B62B 9/26 |
| 2018/0154916 | A1 * | 6/2018 | Yu | B62B 3/027 |
| 2019/0092363 | A1 * | 3/2019 | Ostergaard | B62B 3/008 |
| 2020/0307665 | A1 * | 10/2020 | Su | B62B 3/022 |
| 2021/0107551 | A1 * | 4/2021 | Sturgeon | B62B 7/062 |

(Continued)

*Primary Examiner* — John Olszewski
(74) *Attorney, Agent, or Firm* — WPAT LAW, P.C.; Anthony King

(57) ABSTRACT

A handcart open on two sides having a frame, wherein the frame has a front frame, a rear frame, two symmetrical side frames, a chassis and wheels; the front frame has two vertical pipes, a lower horizontal pipe, a baffle and two connecting belts; a fixing base and a wheel are arranged at the top and bottom of each vertical pipe respectively, and two ends of the lower horizontal pipe are respectively mounted on lower ends of the two vertical pipes; a low end of the baffle is rotatably connected with the low horizontal pipe, and two sides of the baffle are respectively riveted to the two fixing bases through one connecting belt; the rear frame also has a structure consisting of vertical pipes.

10 Claims, 9 Drawing Sheets

(56) References Cited

U.S. PATENT DOCUMENTS

| | | | | |
|---|---|---|---|---|
| 2023/0322284 | A1* | 10/2023 | Zhu | B62B 3/025 |
| 2024/0124039 | A1* | 4/2024 | Zhao | B62B 3/025 |
| 2024/0227907 | A1* | 7/2024 | Ma | B62B 5/082 |

* cited by examiner

HANDCART OPEN ON TWO SIDES

BACKGROUND OF THE INVENTION

1. Technical Field

Handcarts, in particular to a handcart open on two sides.

2. Description of Related Art

To facilitate the transportation of goods in daily life, handcarts are commonly used, effectively minimizing the manpower required. While transportation technology continues to evolve, handcarts have retained their status as an essential tool. With their low cost, easy maintenance, convenient operation, and lightweight design, handcarts can be used in places where motor vehicles are impractical. They are widely employed for the handling of lighter loads over short distances.

Most existing handcarts are composed of wheels, handles and baskets. The handle is arranged at one side of the basket, the wheels are located below the basket, and the basket is usually a square-shaped basket designed for holding items and mounted on a base in a non-detachable manner. Due to the inability to fold, these handcarts incur high transportation costs, suffer from significant wear and tear during transportation, and are inconvenient to store. Although there are folding handcarts, the folding mechanism fails to adjust the height of the basket, making it unable to accommodate longer items when opening one side, thus compromising the convenience of transportation.

BRIEF SUMMARY OF THE INVENTION

In view of the defects of the prior art, the invention provides a handcart open on two sides. The handcart can be opened and folded from both the front and back sides. Users can freely adjust the storage space of the handcart according to their transportation needs. This feature facilitates the accommodation of objects with varying lengths or sizes, thus enhancing the flexibility in usage.

In order to achieve the above purpose, the invention adopts the following technical scheme. A handcart open on two sides comprises a frame, wherein the frame comprises a front frame, a rear frame, two symmetrical side frames, a chassis and wheels; the front frame comprises two vertical pipes, a lower horizontal pipe, a baffle and two connecting belts; a fixing base and a wheel are arranged at the top and bottom of each vertical pipe respectively, and two ends of the lower horizontal pipe are respectively mounted on lower ends of the two vertical pipes; a low end of the baffle is rotatably connected with the low horizontal pipe, and two sides of the baffle are respectively riveted to the two fixing bases through one connecting belt; the rear frame also comprises a structure consisting of vertical pipes, a lower horizontal pipe, a baffle and two connecting belts; and front and rear ends of each side frame are rotatably connected with the fixing bases on the front frame and the rear frame respectively, and front and rear ends of the chassis are rotatably connected with the lower horizontal pipes on the front frame and the rear frame respectively.

Further, the connecting belt in the front frame is webbing with an adjustable buckle; alternatively, the adjustable component comprises a first strip with a chute and a second strip with a limiting protrusion at an upper end, and the limiting protrusion is mounted in a through hole at the upper end of the second strip through a spring; the chute is arranged in a length direction of the first strip, and a plurality of engage grooves are uniformly distributed in the chute; and the limiting protrusion slides in the chute and is fitted into any engage groove, an upper end of the first strip is riveted to the fixing base, and a lower end of the second strip is riveted to the baffle.

Further, at least two mounting positions are arranged at different heights on two sides of the baffle, and the connecting belt is riveted to any mounting position.

Further, the baffle is provided with a plurality of through holes.

Further, the front frame or the rear frame further comprises a U-shaped upper handrail and two upper short pipes, the upper short pipe is mounted at a top of the fixing base, the upper handrail is arranged outside the vertical pipe, and two ends of the upper handrail are hinged to top ends of the two upper short pipes respectively.

Further, the rear frame also comprises a U-shaped leg pipe arranged outside the baffle, and two ends of the U-shaped leg pipe are riveted to two sides of the baffle.

Further, the chassis comprises two symmetrically arranged bottom plate components, the bottom plate component comprises a bottom plate and two bottom pipes fixed below the bottom plate in parallel, one ends of the bottom pipes of the two bottom plate components are riveted to each other, and the other ends are riveted to the lower horizontal pipe of the front frame or the rear frame.

Further, the handcart open on two sides also comprises a bottom horizontal pipe, wherein two ends of the bottom horizontal pipe are riveted to bottom ends of middle parts of the two side frames respectively.

Further, the side frame comprises two side horizontal pipes and two cross pipes hinged together. One ends of the two side horizontal pipes are hinged to upper ends of short pipes of the front and rear cross pipes respectively, and the other ends of the two side horizontal pipes are riveted to the fixing bases of the front frame and the rear frame respectively; and lower ends of long pipes of the front and rear cross pipes are riveted to the lower horizontal pipes of the front frame and the rear frame respectively.

Further, the handcart open on two sides also comprises a cloth bag with extensible front and rear side walls, wherein left and right side walls of the cloth bag are detachably mounted on the two side frames, and the front and rear side walls of the cloth bag are detachably mounted on the front frame and the rear frame.

Further, the wheels are wheels with brakes.

By adopting the technical scheme, the invention has the following beneficial effects:

Figure 1:
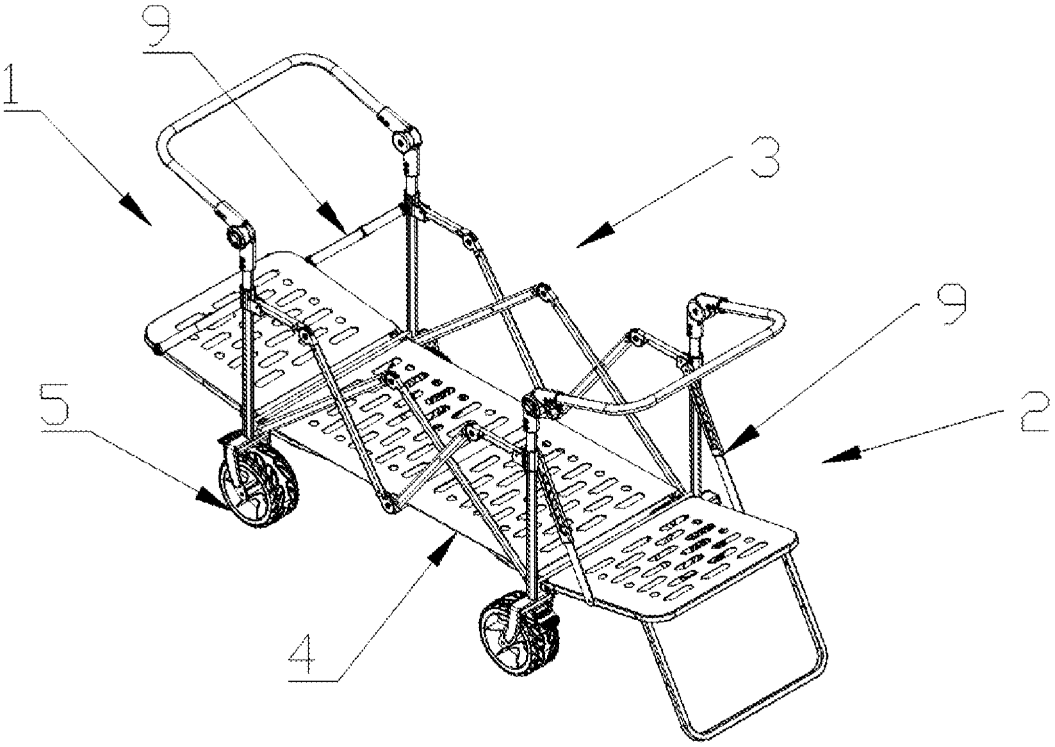
FIG. 1 is an unfolded state diagram of a handcart open on two sides.
Figure 2:
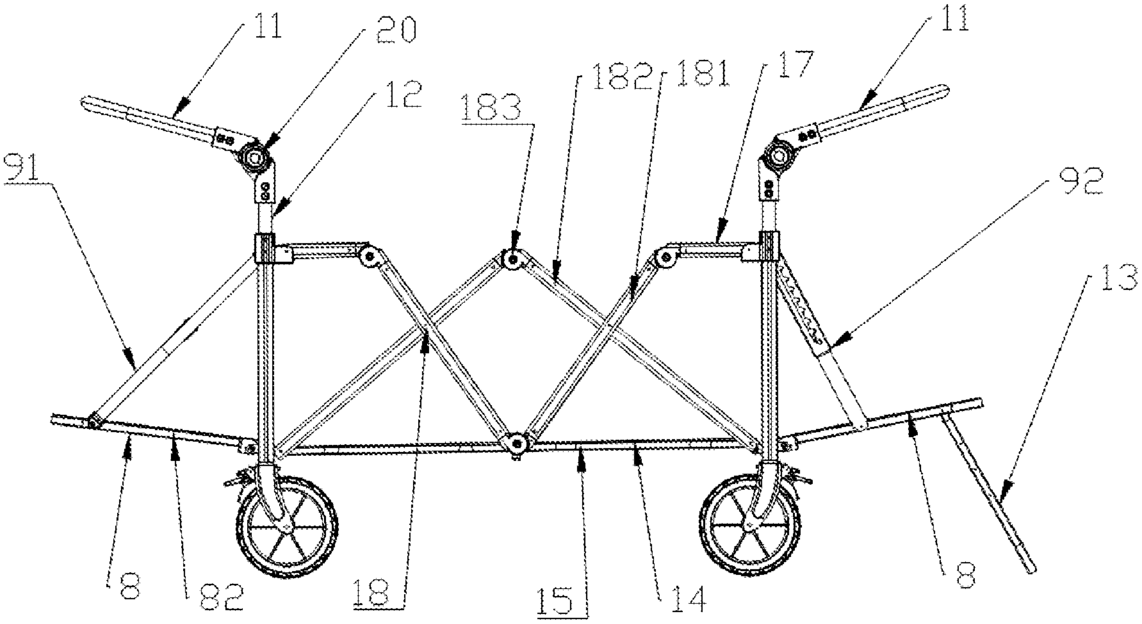
FIG. 2 is a front view of a handcart open on two sides.
Figure 3:
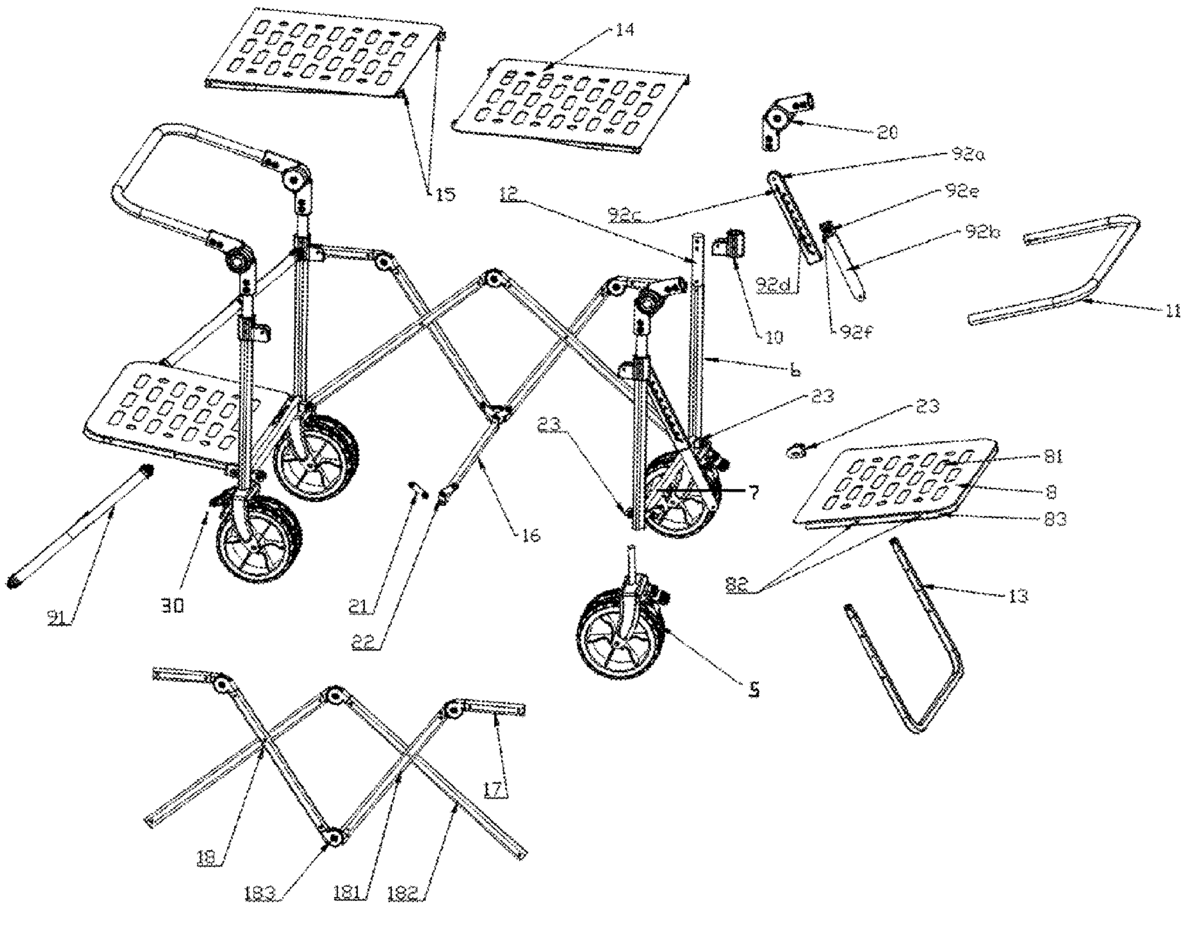
FIG. 3 is a disassembled state diagram of a handcart open on two sides.

Included in the drawings are: 1 front frame, 2 rear frame, 3 side frame, 4 chassis, 5 wheel, 6 vertical pipe, 7 lower horizontal pipe, 8 baffle, 81 through hole, 82 mounting position, 83 U-shaped stay pipe, 9 connecting belt, 91 first connecting belt, 92 second connecting belt, **92*a* first strip, 92*b* second strip, 92*c* chute, 92*d* engage groove, 92*e* limiting protrusion, 92*f* spring, 10 fixing base, 11 upper handrail, 12 upper short pipe, 13 U-shaped leg pipe, 14 bottom plate, 15 bottom pipe, 16 bottom horizontal pipe, 17 side horizontal pipe, 18 cross pipe, 181 short pipe, 182 long pipe, 183 hinge, 19 cloth bag, 191 mounting opening, 20 pipe joint, 21 connecting piece, 22 bent piece, 23** U-shaped piece.

DETAILED DESCRIPTION OF THE INVENTION

The specific embodiments of the invention will be further elaborated with the attached drawings to make the technical scheme more clear.

As shown in FIGS. 1-9, this embodiment discloses a handcart open on two sides, which comprises a frame, wherein the frame comprises a front frame 1, a rear frame 2, two symmetrical side frames 3, a chassis 4 and wheels 5; the front frame 1 comprises two vertical pipes 6, a lower horizontal pipe 7, a baffle 8 and two connecting belts 9; a fixing base 10 and a wheel 5 are arranged at the top and bottom of each vertical pipe 6 respectively, and two ends of the lower horizontal pipe 7 are respectively mounted on lower ends of the two vertical pipes 6; a low end of the baffle 8 is rotatably connected with the low horizontal pipe 7, and two sides of the baffle 8 are respectively riveted to the two fixing bases 10 through one connecting belt 9; the rear frame also comprises a structure consisting of vertical pipes 6, a lower horizontal pipe 7, a baffle 8 and two connecting belts 9; and front and rear ends of each side frame 3 are rotatably connected with the fixing bases 10 on the front frame 1 and the rear frame 2 respectively, and front and rear ends of the chassis 4 are rotatably connected with the lower horizontal pipes 7 on the front frame 1 and the rear frame 2 respectively.

In order to improve the firmness of the baffle, a U-shaped stay pipe 83 is fixedly arranged along an outer edge of the baffle 8 to enhance the supporting effect of the front frame and the rear frame. Two ends of the U-shaped stay pipe 83 are riveted to the lower horizontal pipe 7 through U-shaped pieces 23.

In a specific embodiment, a first connecting belt 91 in the front frame 1 is webbing with an adjustable buckle, and the length of the webbing can be adjusted through the adjustable buckle, so as to control the maximum opening degree of the front frame; a second connecting belt 92 in the rear frame 2 is an adjustable component, which comprises a first strip **92*a* with a chute and a second strip 92*b* with a limiting protrusion 92*e* at an upper end, and the limiting protrusion 92*e* is mounted in a through hole at the upper end of the second strip 92*b* through a spring 92*f* (specifically, a column is arranged on a side wall of the through hole, one end of the spring 92*f* is fixed on the column, and the other end of the spring is provided with the limiting protrusion 92*e*); the chute 92*c* is arranged in a length direction of the first strip, and a plurality of engage grooves 92*d* are uniformly distributed in the chute 92*c*; the limiting protrusion 92*e* slides in the chute 92*c* and is fitted into any engage groove 92*d*, an upper end of the first strip 92*a* is riveted to the fixing base 10, and a lower end of the second strip 92*b* is riveted to the baffle 8; and the compression of the spring 92*f* facilitates the sliding movement and snap-fit of the limiting protrusion 92*e***.

At least two mounting positions 82 are arranged at different heights on two sides of the baffle 8, and the connecting belt 9 is riveted to any mounting position 82. The mounting positions 82 are located on an outer side of the U-shaped stay pipe 83.

The baffle 8 is provided with a plurality of through holes 81, which can reduce the weight of the whole baffle.

The front frame 1 or the rear frame 2 further comprises a U-shaped upper handrail 11 and two upper short pipes 12, the upper short pipe 12 is mounted at a top of the fixing base 10, the upper handrail 11 is arranged outside the vertical pipe 6, and two ends of the upper handrail 11 are hinged to top ends of the two upper short pipes 12 respectively. The upper short pipe 12 is hinged to the end of the upper handrail 11 through a pipe joint 20, and the pipe joint 20 consists of two connectors with one end riveted and the other end provided with a joint. An upper end of the upper short pipe 12 or the end of the upper handrail 11 is embedded in one of the joints and fixed by a fastener.

In this embodiment, the fixing base 10 is a pipe sleeve with an upper end and a lower end respectively sleeved on a lower end of the upper short pipe 12 and an upper end of the vertical pipe 6 and then fixed by fasteners.

The rear frame 2 also comprises a U-shaped leg pipe 13 arranged outside the baffle, and two ends of the U-shaped leg pipe 13 are riveted to two sides of the baffle 8.

The chassis 4 comprises two symmetrically arranged bottom plate components, the bottom plate component comprises a bottom plate 14 and two bottom pipes 15 fixed below the bottom plate in parallel, one ends of the bottom pipes 15 of the two bottom plate components are riveted to each other, and the other ends are riveted to the lower horizontal pipe 7 of the front frame or the rear frame. The bottom pipe 15 is riveted to the lower horizontal pipe 7 through the U-shaped piece 23, specifically, the U-shaped piece 23 is fixed on the lower horizontal pipe 7, and the bottom pipe 15 is inserted into a depression of the U-shaped piece 23 and riveted. The bottom plate 14 is provided with a plurality of through holes to reduce the weight of the whole handcart.

The side frame 3 comprises two side horizontal pipes 17 and two cross pipes 18 hinged together. One ends of the two side horizontal pipes 17 are hinged to upper ends of short pipes 181 of the front and rear cross pipes 18 respectively, and the other ends of the two side horizontal pipes 17 are riveted to the fixing bases 10 of the front frame 1 and the rear frame 2 respectively. Lower ends of long pipes 182 of the front and rear cross pipes are riveted to the lower horizontal pipes of the front frame and the rear frame respectively. The hinging is realized by a hinge 183 which comprises two symmetrical parts, one ends of the two parts are riveted by pins, and the other ends are inserted into the side horizontal pipe 17, the short pipe 181 or the long pipe 182 and fixed by fasteners (screws, etc.).

In one embodiment, the frame further comprises a bottom horizontal pipe 16, and two ends of the bottom horizontal pipe 16 are riveted to bottom ends of middle parts of the two side frames 3 respectively. Specifically, the ends of the bottom horizontal pipe 16 are rotatably connected with bottom ends of the two short pipes 181 of the two cross pipes 18. Two connecting pieces are arranged at the joints of the bottom horizontal pipe 16 and the cross pipes 18 for rivet-fitting, and a lower end of one connecting piece 21, a bent part of another bent piece 22 and the hinge 183 for hinging the two short pipes 181 are riveted together. A lower end of the bent piece 22 is fixed at an end of the bottom horizontal pipe 16, and an upper end of the bent piece 22 and an upper end of the connecting piece 21 are riveted to bottom ends of the two short pipes 181 respectively.

In one embodiment, the handcart open on two sides further comprises a cloth bag 29 with extensible front and rear side walls, left and right side walls of the cloth bag 19 are detachably mounted on the two side frames, and the front and rear side walls of the cloth bag 19 are detachably mounted on the front frame 1 and the rear frame 2. Specifically, mounting openings 191 are formed in the left and right side walls and located at hinge points of the side horizontal pipes 17 and the upper ends of the two cross pipes 18. The left and right side walls can be mounted on the baffle 8 by means of hook and loop adhesion or sleeving through the mounting openings.

In one embodiment, the wheel 5 can either be a commercially available wheel with brakes 30 or a tire assembly featuring a tire brake with the publication number CN217575319U, so as to allow for the locking or unlocking of the wheel.

Figure 4:
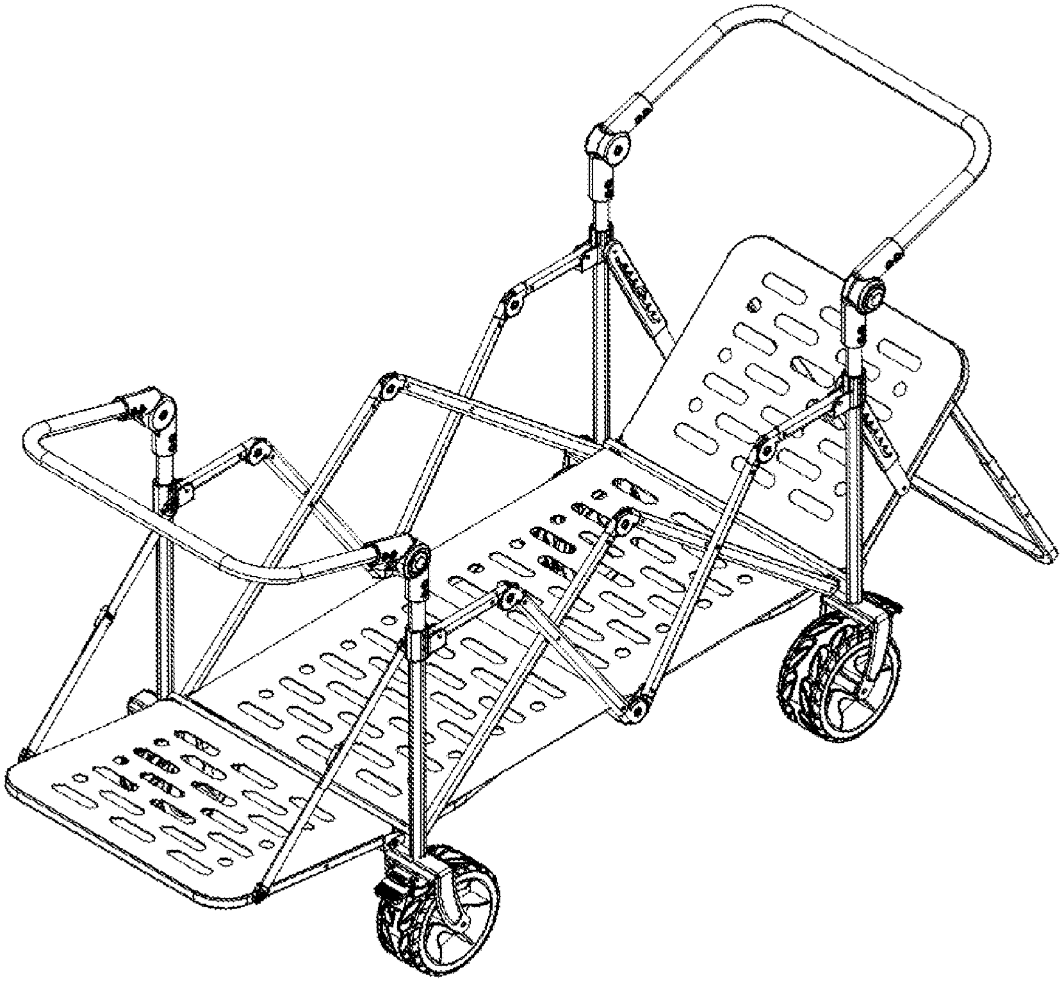
FIG. 4 is an adjustment state diagram of a handcart open on two sides.
Figure 5:
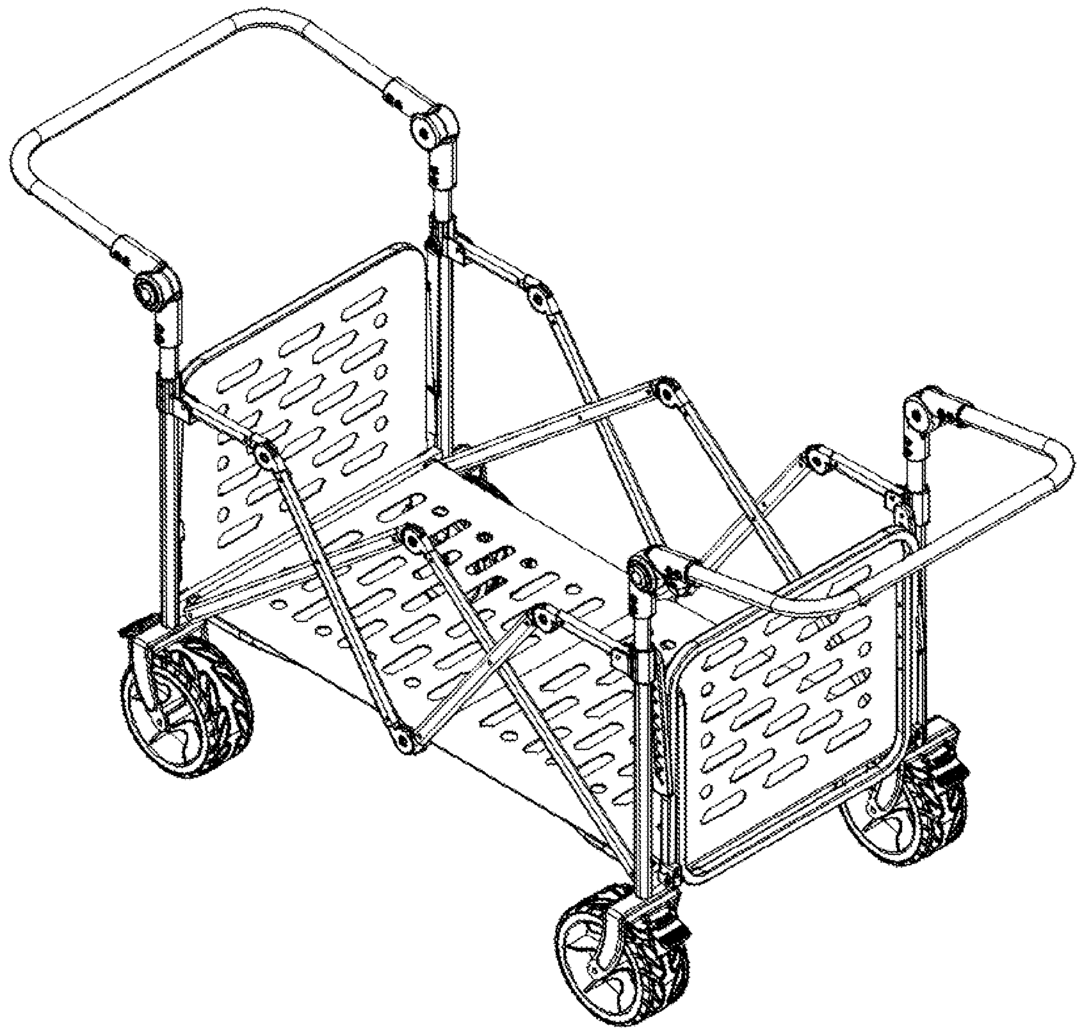
FIG. 5 is a closed state diagram of a handcart open on two sides.
Figure 6:
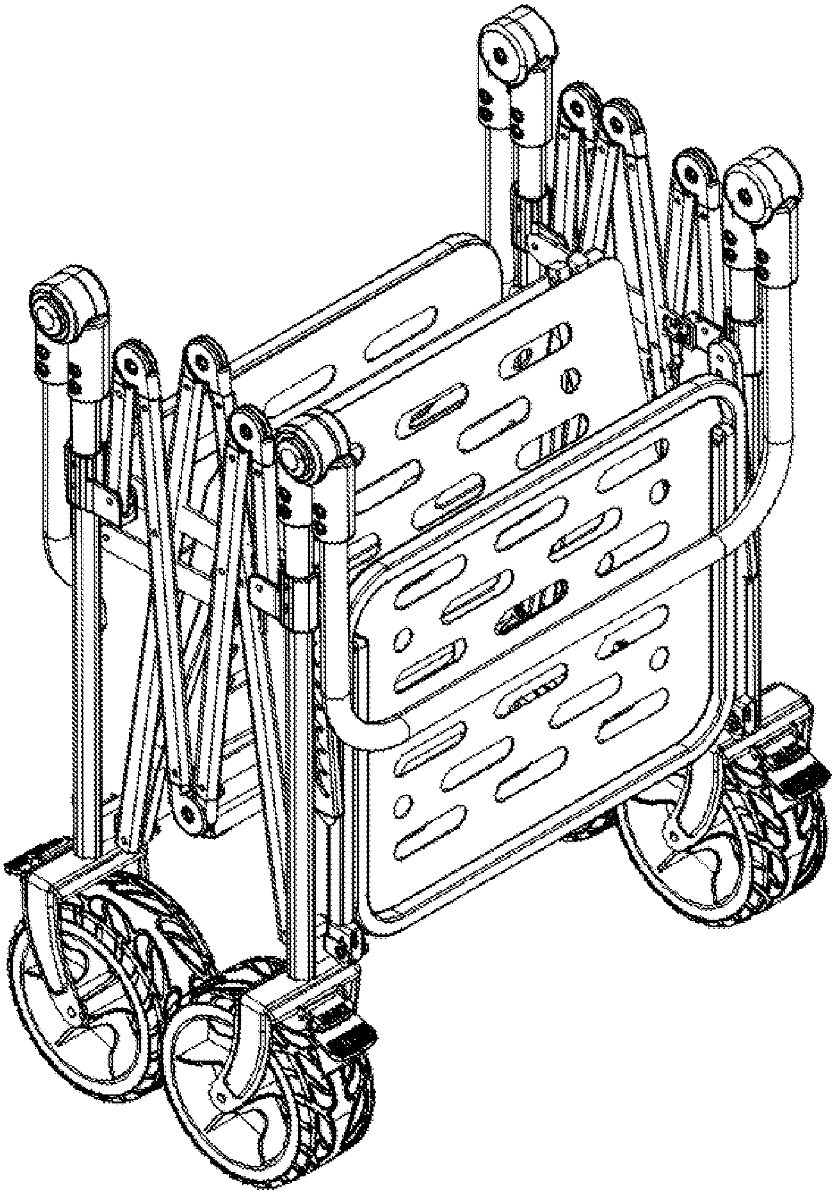
FIG. 6 is a folded state diagram of a handcart open on two sides.
Figure 7:
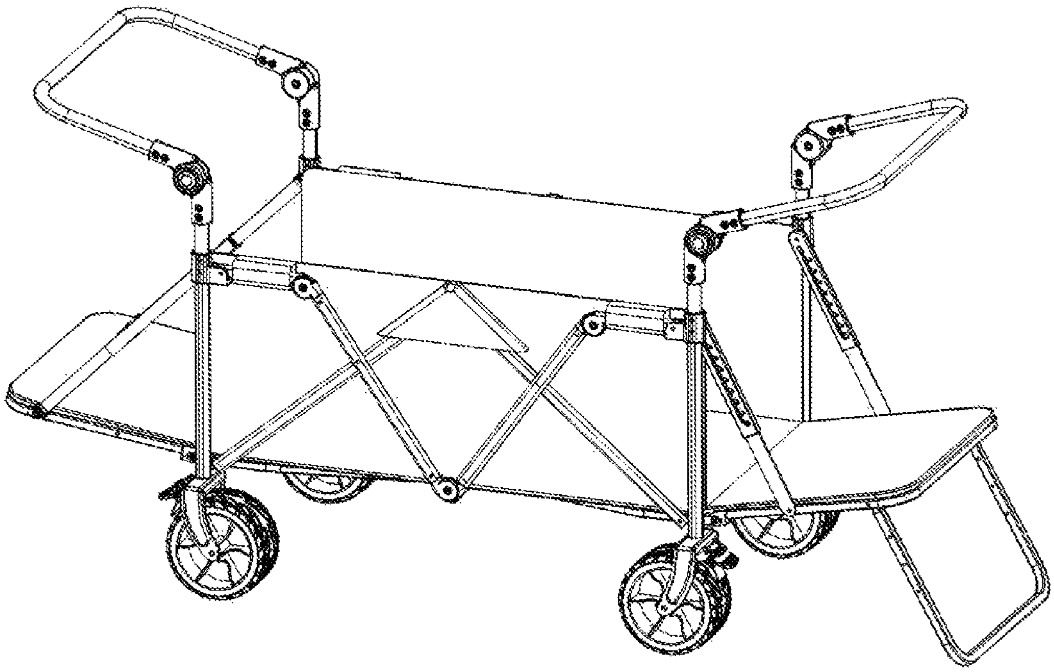
FIG. 7 is a diagram of a handcart open on two sides with a cloth bag.
Figure 8:
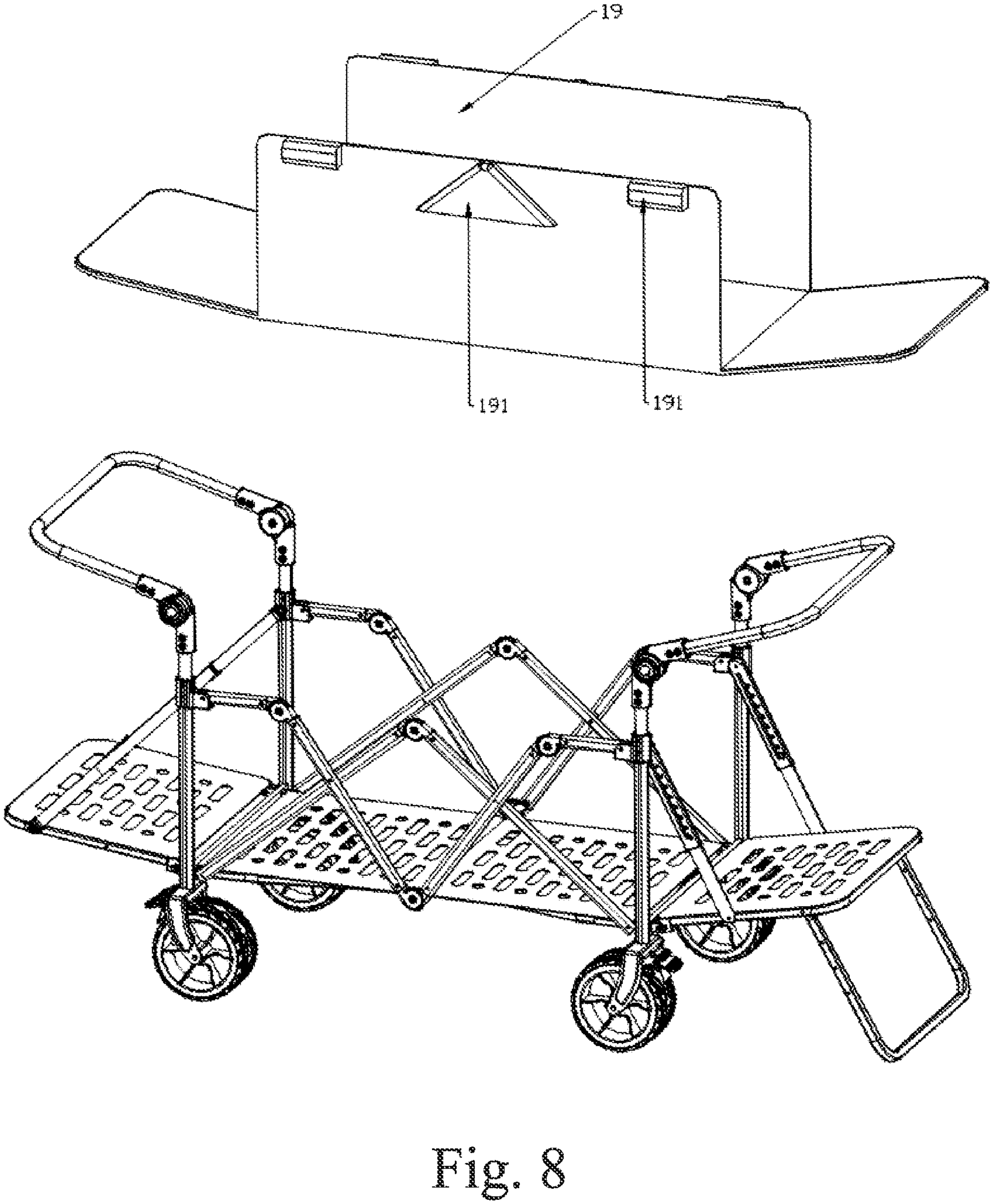
FIG. 8 is a disassembled state diagram of a handcart open on two sides with a cloth bag.
Figure 9:
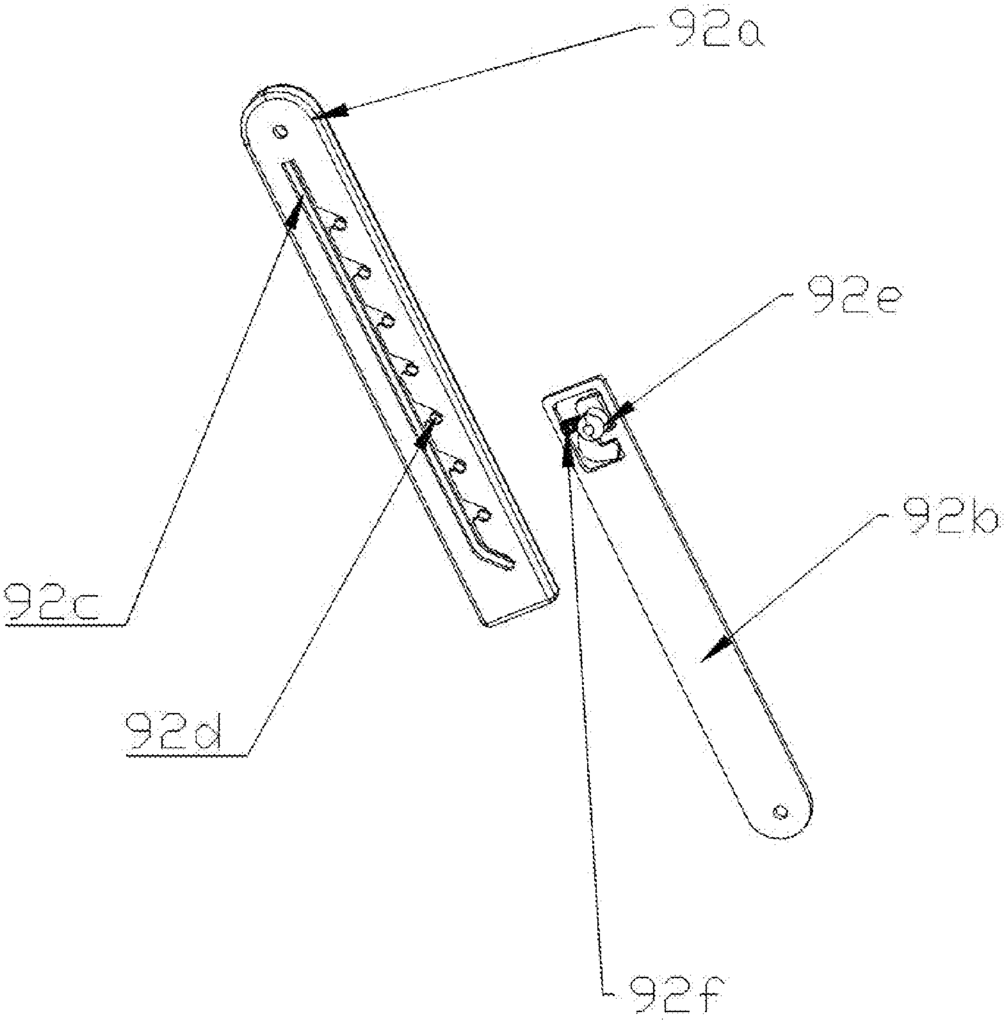
FIG. 9 is an exploded view of a second connecting belt.

According to the handcart open on two sides in this embodiment, the front and rear sides can be opened through the connecting belts 9, the whole frame adopts a foldable design, the open state is shown in FIG. 1, the opening degree adjustment state is shown in FIG. 4, the final closed state is shown in FIG. 5, and the frame can be folded into the state as shown in FIG. 6.

Note that the above embodiments are only preferred ones of the invention and technical principles applied thereto. Those skilled in the art will understand that the invention is not limited to the specific embodiments described here, and those skilled in the art can make various obvious changes, readjustments and substitutions without departing from the protection scope of the invention. Therefore, although the invention has been described in detail through the above embodiments, the invention is not limited to the above embodiments, but can also include more equivalent embodiments without departing from the concept of the invention, and the scope of the invention is determined by the scope of the appended Claims.

What is claimed is:

1. A handcart open on two sides, comprising:

a frame, wherein the frame comprises a front frame, a rear frame, two symmetrical side frames, a chassis and wheels;

the front frame comprises two vertical pipes, a lower horizontal pipe, a baffle and two connecting belts;

a fixing base and a wheel are arranged at the top and bottom of each vertical pipe respectively, and two ends of the lower horizontal pipe are respectively mounted on lower ends of the two vertical pipes;

a low end of the baffle is rotatably connected with the low horizontal pipe, and two sides of the baffle are respectively riveted to the two fixing bases through one connecting belt;

the rear frame also comprises a structure consisting of vertical pipes, a lower horizontal pipe, a baffle and two connecting belts; and front and rear ends of each side frame are rotatably connected with the fixing bases on the front frame and the rear frame respectively; and front and rear ends of the chassis are rotatably connected with the lower horizontal pipes on the front frame and the rear frame respectively.

2. The handcart open on two sides according to claim 1, wherein the connecting belt in the front frame is webbing with an adjustable buckle;

alternatively, the connecting belt in the rear frame is an adjustable component, which comprises a first strip with a chute and a second strip with a limiting protrusion at an upper end, and the limiting protrusion is mounted in a through hole at the upper end of the second strip through a spring; the chute is arranged in a length direction of the first strip, and a plurality of engage grooves are uniformly distributed in the chute; and the limiting protrusion slides in the chute and is fitted into any engage groove, an upper end of the first strip is riveted to the fixing base, and a lower end of the second strip is riveted to the baffle.

3. The handcart open on two sides according to claim 1, wherein at least two mounting positions are arranged at different heights on two sides of the baffle, and the connecting belt is riveted to any mounting position.

4. The handcart open on two sides according to claim 1, wherein the baffle is provided with a plurality of through holes.

5. The handcart open on two sides according to claim 1, wherein the front frame or the rear frame further comprises a U-shaped upper handrail and two upper short pipes, the upper short pipe is mounted at a top of the fixing base, the upper handrail is arranged outside the vertical pipe, and two ends of the upper handrail are hinged to top ends of the two upper short pipes respectively;

alternatively, the rear frame also comprises a U-shaped leg pipe arranged outside the baffle, and two ends of the U-shaped leg pipe are riveted to two sides of the baffle.

6. The handcart open on two sides according to claim 1, wherein the chassis comprises two symmetrically arranged bottom plate components, the bottom plate component comprises a bottom plate and two bottom pipes fixed below the bottom plate in parallel, one ends of the bottom pipes of the two bottom plate components are riveted to each other, and the other ends are riveted to the lower horizontal pipe of the front frame or the rear frame.

7. The handcart open on two sides according to claim 1, further comprising a bottom horizontal pipe, wherein two ends of the bottom horizontal pipe are riveted to bottom ends of middle parts of the two side frames respectively.

8. The handcart open on two sides according to claim 1, further comprising a cloth bag with extensible front and rear side walls, wherein left and right side walls of the cloth bag are detachably mounted on the two side frames, and the front and rear side walls of the cloth bag are detachably mounted on the front frame and the rear frame.

9. The handcart open on two sides according to claim 8, wherein the side frame comprises two side horizontal pipes and two cross pipes hinged together; wherein said one ends of the two side horizontal pipes are hinged to upper ends of short pipes of the front and rear cross pipes respectively, and the other ends of the two side horizontal pipes are riveted to the fixing bases of the front frame and the rear frame respectively; and lower ends of long pipes of the front and rear cross pipes are riveted to the lower horizontal pipes of the front frame and the rear frame respectively.

10. The handcart open on two sides according to claim 1, wherein the wheels are wheels with brakes.

* * * * *